United States Patent
Cheng

(10) Patent No.: US 8,154,441 B2
(45) Date of Patent: Apr. 10, 2012

(54) ELECTRONIC DEVICE AND METHOD FOR POSITIONING THE ELECTRONIC DEVICE

(75) Inventor: Pin-Chien Cheng, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 367 days.

(21) Appl. No.: 12/558,216

(22) Filed: Sep. 11, 2009

(65) Prior Publication Data
US 2010/0103037 A1  Apr. 29, 2010

(30) Foreign Application Priority Data
Oct. 28, 2008 (CN) .......................... 2008 1 0305258

(51) Int. Cl.
*G01S 19/03* (2010.01)
*H04W 24/00* (2009.01)
(52) U.S. Cl. .................................. 342/357.4; 455/456.3
(58) Field of Classification Search ............... 342/357.4; 455/456.3
See application file for complete search history.

(56) References Cited

U.S. PATENT DOCUMENTS

| 6,727,847 | B2* | 4/2004 | Rabinowitz et al. ...... 342/357.29 |
| 2004/0008138 | A1* | 1/2004 | Hockley et al. .......... 342/357.09 |
| 2004/0224702 | A1* | 11/2004 | Chaskar ..................... 455/456.3 |
| 2005/0197137 | A1* | 9/2005 | Radic et al. ................ 455/456.1 |
| 2010/0216432 | A1* | 8/2010 | Wu .............................. 455/411 |
| 2011/0012779 | A1* | 1/2011 | Abraham et al. .......... 342/357.4 |

OTHER PUBLICATIONS

Jarvinen et al., "Assisted GPA: A Low-Infrastructure Approach", Mar. 1, 2002, GPS World.*

* cited by examiner

*Primary Examiner* — Thomas Tarcza
*Assistant Examiner* — Frank J. McGue
(74) *Attorney, Agent, or Firm* — Altis Law Group, Inc.

(57) ABSTRACT

A system and method for positioning an electronic device. The electronic device communicates with one or more monitoring electronic devices via a location server and a plurality of base stations. The system and method receives a standard command message, determines whether information in a received message is the same as information in the standard command message, and obtains position information of the electronic device if the information in the received message is the same as the information in the user-defined standard command message. The system and method further transmit a reply message, which comprises the position information and time for acquiring the position information of the electronic device, to a corresponding monitoring electronic device.

17 Claims, 4 Drawing Sheets

| Monitoring electronic device information | | | Electronic device information | Position Command |
|---|---|---|---|---|
| Phone number | ID | Password | ID | |
| 0935654321 | Sam | 1234 | 3456 | Where are you? |

FIG. 4

ELECTRONIC DEVICE AND METHOD FOR POSITIONING THE ELECTRONIC DEVICE

BACKGROUND

1. Technical Field

Embodiments of the present disclosure are related to positioning devices, and particularly to an electronic device and a method for positioning the electronic device.

2. Description of Related Art

With the development of communication technology, global position systems (GPS) and assisted global position systems (A-GPS) are widely used in electronic devices, such as mobile phones and personal digital assistants. However, at present, many electronic devices having such a positioning function often have many other components, such as keyboards, display screens, speakers, microphones, headphones, thus increasing size and power consumption of the electronic devices. Furthermore, current position systems often do not allow common users (e.g., buyers) to set position parameters based on actual needs.

Therefore, there is a need for an electronic device and a positioning method to overcome the aforementioned problem.

BRIEF DESCRIPTION OF THE DRAWINGS

FIG. 4 shows an example of information contained in a standard command message.

DETAILED DESCRIPTION

All of the processes described may be embodied in, and fully automated via, functional code modules executed by one or more general purpose computers or processors. The code modules may be stored in any type of computer-readable medium or other storage device. Some or all of the methods may alternatively be embodied in specialized computer hardware or electronic apparatus.

Figure 1:
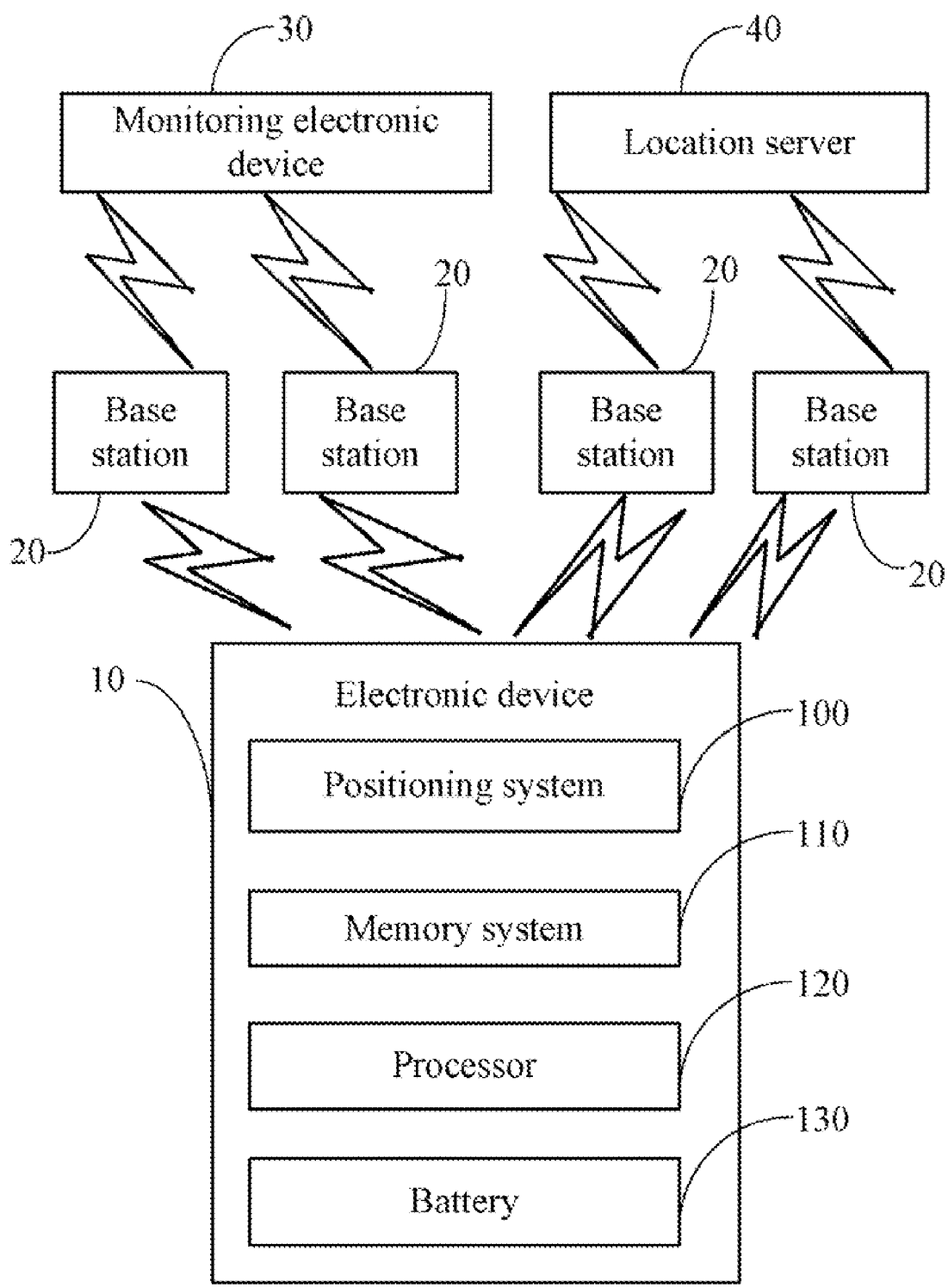
FIG. 1 is a block diagram of one embodiment of an electronic device comprising a positioning system.

FIG. 1 is a block diagram of one embodiment of an electronic device 10 comprising a positioning system 100. In one embodiment, the electronic device 10 communicates with one or more monitoring electronic devices 30 (only one is shown) and a location server 40 via one or more location stations 20. The electronic device 10 is a simplified electronic device, including the positioning system 100, a memory system 110, a processor 120, and a battery 130, but omitting components such as keyboards and display screens, for example. Thus, the electronic device 10 is compact and may be installed in ornaments, such as necklaces, rings, and watches for users, such as children or pets that need to be monitored. Once the electronic device 10 receives a message having preset format and information, the positioning system 100 will acquire positioning information of the electronic device 10, and transmits the positioning information to a designated monitoring electronic devices 30, so as to inform a related person of the position of the electronic device 10. In other embodiments, the electronic device 10 can have one or more auxiliary components, such as a keyboard or a display screen, for example.

In this embodiment, the memory system 110 stores one or more computerized codes of the positioning system 100. The processor 120 executes the one or more computerized codes of the positioning system 100, to realize one or more operations of the positioning system 100. Each of the one or more monitoring electronic devices 30 may be a mobile phone, a computer, or a personal digital assistant, for example. Depending on the embodiment, the memory system 110 may be a smart media card, a secure digital card, or a compact flash card.

Figure 2:
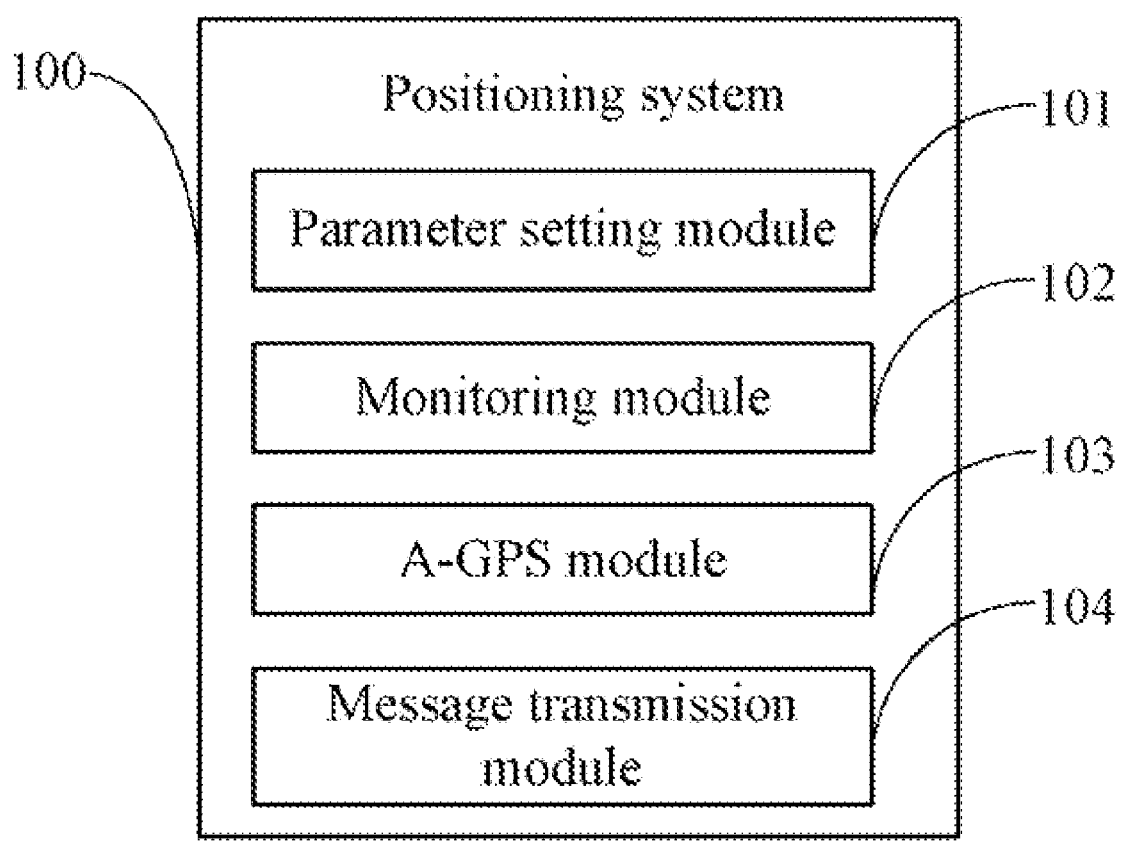
FIG. 2 is a block diagram of function modules of the positioning system in FIG. 1.

FIG. 2 is a block diagram of function modules of the positioning system 100 in FIG. 1. In one embodiment, the positioning system 100 includes a parameter setting module 101, a monitoring module 102, an assisted global positioning system (A-GPS) module 103, and a message transmission module 104.

The parameter setting module 101 receives a user-defined standard command message. In one embodiment, the standard command message includes information on a monitoring electronic device 30, information on the electronic device 10, and a character string representing a position command. The information on the monitoring electronic device 30 may include a phone number, an identifier (ID), and a password of the monitoring electronic device 30. The information on the electronic device 10 may include an ID of the electronic device 10. For example, as shown in FIG. 4, the phone number of the monitoring electronic device 30 is "0935654321," the ID of the monitoring electronic device 30 "Sam," and the password of the monitoring electronic device 30 is "1234." The ID of the electronic device 10 is "3456." The character string representing the position command is "Where are you?"

The monitoring module 102 determines whether the electronic device 10 has received a message from the one or more monitoring electronic devices 30, and determines whether information in the received message is the same as the information defined in the standard command message. For example, the monitoring module 102 may determine whether the phone number information of a monitoring electronic device 30 in the received message is "0935654321," whether the ID information of the monitoring electronic device 30 is "Sam," whether the password of the monitoring electronic device 30 is "1234," whether the ID of the electronic device 10 is "3456," and whether the character string in the received message is "Where are you?"

The A-GPS module 103 transmits location information of a base station 20 with which the electronic device 10 communicates to the location server 50, and receives original satellite signals according to A-GPS information sent by the location server 50. The A-GPS information, which includes orientation and angle information of a GPS satellite, is acquired by the location server 50 according to the location information of the base station 20.

The A-GPS module 103 further determines a pseudo-distance between the electronic device 10 and the GPS satellite according to the original satellite signals, and transmits the pseudo-distance information to the location server 50. The location server 50 determines position information of the electronic device 10 according to the pseudo-distance and the A-GPS information, and transmits the position information and time information for acquiring the position information to the electronic device 10 via the base station 20. The position information includes longitude and latitude information of the electronic device 10. For example, the electronic device 10 may be at longitude 122 degrees east and latitude 24 degrees north at 13:00 o'clock, Jul. 28, 2009.

The message transmission module 104 transmits a reply message, which includes the position information and the time information for acquiring the position information of the electronic device 10, to the monitoring electronic device 30.

In one embodiment, the parameter setting module 101 may further receive an alert power level set by a user of the monitoring electronic device. For example, 10% of a full voltage of the battery 130 may be set as the alert power level. The monitoring module 102 may further monitor current power level of the battery 130. Once the current power level of the battery 130 reaches or falls below the alert power level, the message transmission module 104 automatically transmits an alert message to the monitoring electronic device 30 having the phone number in the standard command message, so as to prompt the user of the monitoring electronic device 30 to charge the battery 130 of the electronic device 10.

In one embodiment, the parameter setting module 101 may further receive a preset time interval (e.g., 5 minutes) of the monitoring electronic device 30. The message transmission module 104 may automatically transmit the reply message described above, which includes the position information and time information for acquiring the position information of the electronic device 10, to the monitoring electronic device 30 at each time interval.

Figure 3:
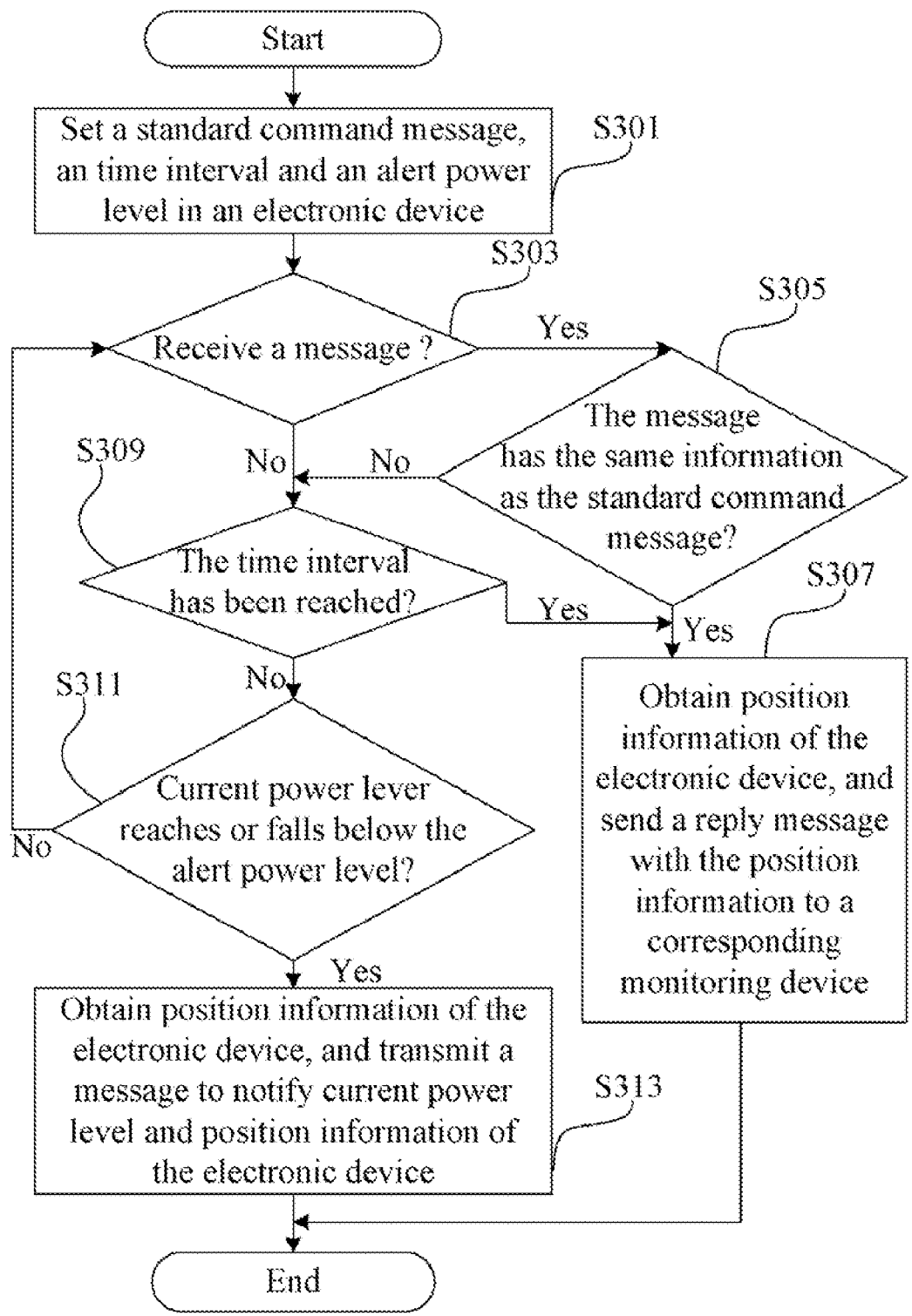
FIG. 3 is a flowchart of one embodiment of a method for positioning the electronic device in FIG. 1.

FIG. 3 is a flowchart of one embodiment of a method for positioning the electronic device 10 in FIG. 1. Depending on the embodiment, additional blocks may be added, others removed, and the ordering of the blocks may be changed.

In block S301, the parameter setting module 101 receives a user-defined standard command message for acquiring position information of the electronic device 10. In one embodiment, the user is a user of the monitoring electronic device 30. As mentioned above, the standard command message includes information on a monitoring electronic device 30, information on the electronic device 10, and a character string representing a positioning command. The information on the monitoring electronic device 30 may include a phone number, an ID, and a password of the monitoring electronic device 30. The information on the electronic device 10 may include an ID of the electronic device 10. For example, as shown in FIG. 4, the phone number of the monitoring electronic device 30 is "0935654321," the ID of the monitoring electronic device 30 "Sam," and the password of the monitoring electronic device 30 is "1234." The ID of the electronic device 10 is "3456." The character string representing the position command is "Where are you?"

In block S301, the parameter setting module 101 further receives a time interval and an alert power level, which are set by the user and used for automatically transmitting the position information of the electronic device 10 to the monitoring electronic device 30. For example, the time interval may be set as 5 minutes, and 10% of a full voltage of the battery 130 may be set as the alert power level.

In block S303, the monitoring module 102 determines whether the electronic device 10 has received a message. If the electronic device 10 receives a message, the procedure goes to block S305. Otherwise, if the electronic device 10 does not receive a message, the procedure goes to block S309.

In block S305, the monitoring module 102 determines whether information in the received message is the same as the information defined in the standard command message. For example, the monitoring module 102 determines whether the phone number of a monitoring electronic device 30 in the received message is "0935654321," whether the ID information of the monitoring electronic device 30 is "Sam," whether the password of the monitoring electronic device 30 is "1234," whether the ID of the electronic device 10 is "3456," and whether the character string in the received message is "Where are you?" If the information contained in the received message is the same as the information defined in the standard command information, the procedure goes to block S307. Otherwise, if the information contained in the received message is different from the information defined in the standard command information, the procedure directly goes to block S309.

In block S307, the A-GPS module 103 obtains current position information of the electronic device 10 by the base stations 20 and the location server 40. In detail, the A-GPS module 103 transmits location information of a base station 20 with which the electronic device 10 communicates to the location server 50, the location server 50 acquires A-GPS information, which includes orientation and angle information of a GPS satellite, according to the location information, and transmits the acquired A-GPS information to the electronic device 10. Furthermore, the A-GPS module 103 receives original satellite signals according to the A-GPS information, determines a pseudo-distance between the electronic device 10 and the GPS satellite according to the original satellite signals, and transmits the pseudo-distance information to the location server 50. The location server 50 determines the position information of the electronic device 10 according to the pseudo-distance and the A-GPS information, and transmits the position information and time information for acquiring the position information to the electronic device 10 via the base station 20.

Furthermore, in block S307, the message transmission module 104 transmits a reply message, which includes the position information and the time information for acquiring the position information of the electronic device 10, to the monitoring electronic device 30. In one embodiment, the position information includes longitude and latitude information of the electronic device 10. For example, the electronic device 10 may be at longitude 122 degrees east and latitude 24 degrees north at 13:00 o'clock, Jul. 28, 2009.

In block S309, the monitoring module 102 determines whether the time interval has been reached. If the time interval has been reached, the procedure goes to block S307. Otherwise, if the time interval has not been reached, the procedure goes to block S311.

In block S311, the monitoring module 102 determines whether current power level of the battery 130 reaches or falls below the alert power level. For example, the monitoring module 102 determines whether the current power level is equal or less than 10% of a full voltage of the battery 130. If the current power level of the battery 130 reaches or falls below the alert power level, the procedure goes to block S313. Otherwise, if the current power level of the battery 130 is more than the alert power level, the procedure returns to block S303 described above.

In block S313, the A-GPS module 103 obtains current position information of the electronic device 10 by the base stations 20 and the location server 40 (detailed description has been given above), the message transmission module 104 transmits a message, which includes the current power level and the position information of the electronic device 10, to the monitoring electronic device 30 having the phone number defined in the standard command message, and the procedure ends.

The positioning system and method may be applied in simplified electronic devices to acquire position information of supervised objects, such as pets, or children. Once the positioning system receives messages having a predefined format and information, or when a predefined time interval has been reached, the positioning system will send a reply message with the position information of the simplified electronic devices to corresponding supervisors. Thus, the supervisors can find the supervised objects according to the position information.

It should be emphasized that the above-described inventive embodiments are merely possible examples of implementations, and set forth for a clear understanding of the principles of the present disclosure. Many variations and modifications may be made to the above-described inventive embodiments without departing substantially from the spirit and principles of the present disclosure. All such modifications and variations are intended to be included herein within the scope of this disclosure and the above-described inventive embodiments, and the present disclosure is protected by the following claims.

What is claimed is:

1. An electronic device, the electronic device in communication with one or more monitoring electronic devices via a location server and a plurality of base stations, the electronic device comprising:
   a battery;
   a memory system;
   at least one processor; and
   one or more programs stored in the memory system to be executed by the at least one processor, the one or more programs comprising:
     a parameter setting module operable to receive a standard command message for acquiring position information of the electronic device, and to receive a user-defined alert power level;
     a monitoring module operable to determine whether the electronic device has received a message, and whether information in the received message is the same as information defined in the standard command message;
     an assisted global positioning system (A-GPS) module operable to obtain the position information of the electronic device by the location server and the plurality of base stations, in response that the information in the received message is the same as the information defined in the standard command message; and
     a message transmission module operable to transmit a reply message which comprises the position information and time for acquiring the position information of the electronic device to a corresponding monitoring electronic device, and to automatically transmit a message which comprises current battery power level and the position information of the electronic device to the corresponding monitoring electronic device, in response that current battery power level of the electronic device reaches or falls below the alert power level.

2. The electronic device of claim 1, wherein the standard command message comprises information on the corresponding monitoring electronic device, information on the electronic device, and a character string representing a position command.

3. The electronic device of claim 1, wherein the parameter setting module is further operable to receive a user-defined time interval, and the message transmission module is further operable to automatically transmit the reply message to the corresponding monitoring electronic device at each time interval.

4. The electronic device of claim 1, wherein the A-GPS module obtaining position information of the electronic device by the location server and the plurality of base stations comprises:
   transmitting location information of a base station with which the electronic device communicates to the location server;
   acquiring A-GPS information by the location server, which includes orientation and angle information of a GPS satellite, according to the location information, and transmitting the acquired A-GPS information to the electronic device;
   receiving original satellite signals according to the A-GPS information by the A-GPS module, determining a pseudo-distance between the electronic device and the GPS satellite according to the original satellite signals, and transmitting the pseudo-distance information to the location server; and
   receiving the position information of the electronic device determined by the location server according to the pseudo-distance and the A-GPS information.

5. The electronic device of claim 1, wherein the monitoring electronic device is a mobile phone, a computer, or a personal digital assistant.

6. The electronic device of claim 1, wherein the memory system is a smart media card, a secure digital card, or a compact flash card.

7. A computer-implemented method for positioning an electronic device, the electronic device in communication with one or more monitoring electronic devices via a location server and a plurality of base stations, the method comprising:
   receiving a standard command message set by a user for acquiring position information of the electronic device, and receiving an alert power level set by the user;
   determining whether information in a received message is the same as information defined in the standard command message;
   obtaining the position information of the electronic device by the location server and the plurality of base stations, in response that the information in the received message is the same as the information defined in the standard command message;
   transmitting a reply message, which comprises the position information and time for acquiring the position information of the electronic device, to a corresponding monitoring electronic device; and
   automatically transmitting a message, which comprises current battery power level and the position information of the electronic device, to the corresponding monitoring electronic device, in response that the current battery power level of the electronic device reaches or falls below the alert power level.

8. The method of claim 7, wherein the standard command message comprises information on the corresponding monitoring electronic device, information on the electronic device, and a character string representing a position command.

9. The method of claim 7, further comprising:
   receiving a time interval set by the user; and
   automatically transmitting the reply message to the corresponding monitoring electronic device at each time interval.

10. The method of claim 7, wherein obtaining position information of the electronic device by the location server and the plurality of base stations comprises:
   transmitting location information of a base station with which the electronic device communicates to the location server;
   acquiring A-GPS information, which includes orientation and angle information of a GPS satellite, according to the location information, and transmitting the acquired A-GPS information to the electronic device by the location server;

receiving original satellite signals according to the A-GPS information, determining a pseudo-distance between the electronic device and the GPS satellite according to the original satellite signals, and transmitting the pseudo-distance information to the location server; and determining the position information of the electronic device according to the pseudo-distance and the A-GPS information, and transmitting the position information and time for acquiring the position information to the electronic device by the location server via the base station.

11. The method of claim 7, wherein the monitoring electronic device is a mobile phone, a computer, or a personal digital assistant.

12. A non-transitory storage medium storing a set of instructions, the set of instructions capable of being executed by a processor to perform a method for positioning an electronic device, the electronic device in communication with one or more monitoring electronic devices via a location server and a plurality of base stations, the method comprising:

receiving a standard command message set by a user for acquiring position information of the electronic device, and receiving an alert power level set by the user;

determining whether the electronic device has received a message, and determining whether information in the received message is the same as information defined in the standard command message;

obtaining the position information of the electronic device by the location server and the plurality of base stations, in response that the information in the received message is the same as the information defined in the standard command message;

transmitting a reply message, which comprises the position information and time for acquiring the position information of the electronic device, to a corresponding monitoring electronic device; and automatically transmitting a message, which comprises current battery power level and the position information of the electronic device, to the corresponding monitoring electronic device, in response that the current battery power level of the electronic device reaches or falls below the alert power level.

13. The storage medium of claim 12, wherein the standard command message comprises information on the corresponding monitoring electronic device, information on the electronic device, and a character string representing a position command.

14. The storage medium of claim 12, wherein the method further comprises:

receiving a time interval set by the user; and automatically transmitting the reply message to the corresponding monitoring electronic device at each time interval.

15. The storage medium of claim 12, wherein obtaining position information of the electronic device by the location server and the plurality of base stations comprises:

transmitting location information of a base station with which the electronic device communicates to the location server;

acquiring A-GPS information, which includes orientation and angle information of a GPS satellite, according to the location information, and transmitting the acquired A-GPS information to the electronic device by the location server;

receiving original satellite signals according to the A-GPS information, determining a pseudo-distance between the electronic device and the GPS satellite according to the original satellite signals, and transmitting the pseudo-distance information to the location server; and determining the position information of the electronic device according to the pseudo-distance and the A-GPS information, and transmitting the position information and time information for acquiring the position information to the electronic device by the location server via the base station.

16. The storage medium of claim 12, wherein the monitoring electronic device is a mobile phone, a computer, or a personal digital assistant.

17. The storage medium of claim 12, wherein the storage medium is a smart media card, a secure digital card, or a compact flash card.

* * * * *